United States Patent
Oslin et al.

(10) Patent No.: US 10,718,312 B2
(45) Date of Patent: Jul. 21, 2020

(54) WIND TURBINE

(71) Applicant: Flying Diamonds Energy Company LLC, Ann Arbor, MI (US)

(72) Inventors: Brian Oslin, Carmichael, CA (US); Alva B. Oslin, Ann Arbor, MI (US)

(73) Assignee: Flying Diamonds Energy Company LLC, Ann Arbor, MI (US)

( * ) Notice: Subject to any disclaimer, the term of this patent is extended or adjusted under 35 U.S.C. 154(b) by 0 days.

(21) Appl. No.: 16/431,027

(22) Filed: Jun. 4, 2019

(65) Prior Publication Data

US 2019/0376488 A1     Dec. 12, 2019

Related U.S. Application Data

(60) Provisional application No. 62/681,539, filed on Jun. 6, 2018.

(51) Int. Cl.
  *F03D 3/06*    (2006.01)
  *F03D 3/00*    (2006.01)
  *F03D 80/50*   (2016.01)

(52) U.S. Cl.
  CPC ............ *F03D 3/062* (2013.01); *F03D 3/005* (2013.01); *F03D 3/067* (2013.01); *F03D 3/068* (2013.01); *F05D 2250/90* (2013.01)

(58) Field of Classification Search
  CPC . F03D 3/002; F03D 7/06; F03D 3/062; F03D 3/005; F03D 3/067; F03D 3/068; F05B 2240/211; F05B 2240/213; F05B 2240/214; F05B 2240/216; F05B 2240/2212; F05D 2250/90
  See application file for complete search history.

(56) References Cited

U.S. PATENT DOCUMENTS

| | | | |
|---|---|---|---|
| 4,494,007 A | 1/1985 | Gaston | |
| 5,525,037 A | 6/1996 | Cummings | |
| 5,823,749 A * | 10/1998 | Green | F03D 3/067 416/132 B |
| 6,126,385 A | 10/2000 | Lamont | |
| 6,682,302 B2 | 1/2004 | Noble | |
| 6,740,989 B2 | 5/2004 | Rowe | |
| 7,094,017 B2 | 8/2006 | Kurita | |
| 7,696,635 B2 | 4/2010 | Boone | |
| 8,164,210 B2 * | 4/2012 | Boone | F03D 3/005 290/55 |

(Continued)

FOREIGN PATENT DOCUMENTS

KR    20130078446 A    7/2013
WO    2014109496 A1    7/2014

*Primary Examiner* — Ninh H. Nguyen
*Assistant Examiner* — Eric J Zamora Alvarez
(74) *Attorney, Agent, or Firm* — Young Basile Hanlon & MacFarlane, P.C.

(57) ABSTRACT

A wind turbine comprising a support structure for supporting a rotatable, substantially vertical hub wherein at least one substantially horizontal support arm is connected to the hub. At least one wind trap is connected to each of the at least one support arm, and each of the at least one wind trap supports at least one petal that may move between an open position, wherein wind is not blocked by the at least one petal, and a closed position, wherein the at least one petal blocks the wind thereby causing the wind to move the at least one wind trap and rotate the hub.

8 Claims, 16 Drawing Sheets

(56) References Cited

U.S. PATENT DOCUMENTS

| | | | | |
|---|---|---|---|---|
| 8,668,455 B2* | 3/2014 | Finnell | ............... | F03D 1/0608 |
| | | | | 416/132 B |
| 9,024,463 B2 | 5/2015 | Boone | | |
| 2007/0269311 A1* | 11/2007 | Browning | ............ | B63H 9/0642 |
| | | | | 416/132 B |
| 2008/0181777 A1* | 7/2008 | Bailey | ................... | F03D 3/067 |
| | | | | 416/117 |
| 2011/0042958 A1 | 2/2011 | Vander Straeten | | |
| 2011/0182733 A1* | 7/2011 | Howard | ................ | F03D 3/067 |
| | | | | 416/99 |
| 2011/0215582 A1* | 9/2011 | Parera | ..................... | F03D 9/25 |
| | | | | 290/55 |
| 2012/0121380 A1* | 5/2012 | Tein | ...................... | F03D 3/067 |
| | | | | 415/4.2 |
| 2018/0106239 A1 | 4/2018 | Shrewsbury | | |

\* cited by examiner

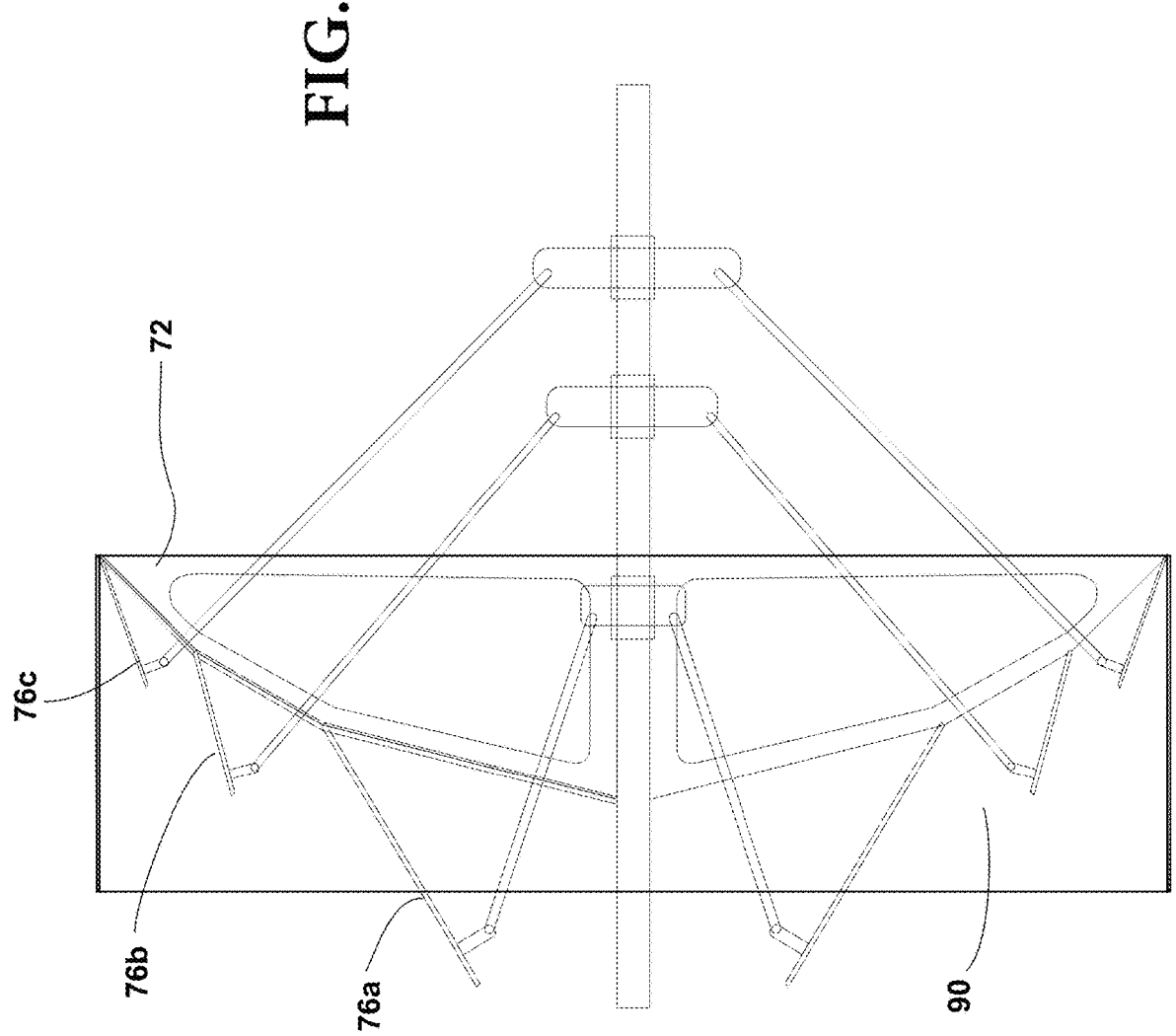

WIND TURBINE

CROSS-REFERENCE TO RELATED APPLICATION(S)

This application claims priority to and the benefit of U.S. Provisional Patent Application No. 62/681,539 filed on Jun. 6, 2018, the disclosure of which is incorporated herein by reference in its entirety.

TECHNICAL FIELD

The present disclosure relates to wind turbines, and more particularly, to a Savonius-type wind turbine having a vertical axis and a plurality of horizontally disposed, diamond shaped wind traps having internal synchronized petals that move between an open position, wherein wind is allowed to pass through the wind traps without being captured by the wind traps thereby creating little drag, and a closed position, wherein wind is captured by the wind traps to drive and rotate the wind turbine.

BACKGROUND

The problems associated with traditional energy sources, such as coal, oil, nuclear energy, and non-renewable energy, have long been noted, including causing serious environmental concerns as well as their limited supply. A solution to these problems is the development and use of alternative energy sources, such as wind, solar, and water. Wind has been seen as a viable energy source, as wind generally exist in all environments, while solar and water supplies may be limited in certain environments. Thus, wind turbines have been developed to harness wind as an energy source; however, disadvantages and inefficiencies with wind turbines still exist.

A common commercial wind turbine that exists today is the horizontal axis wind turbine that utilizes large blades that rotate about the horizontal axis. In order to be efficient, these wind turbines must be mounted high in the air thereby requiring high towers and long blades which are difficult and expensive to transport. Because of their height, these wind turbines are also difficult to maintain since the gearbox, generator, and rotor are all located at the top of the tower. In addition, the cantilevered loads and the associated vibration effectively over-heat and prematurely wear the rotational bearings thereby causing early expiration of the bearings.

To cure some of the problems and disadvantages associated with horizontal axis wind turbines, vertical wind axis turbines were developed. One commonly known vertical axis wind turbine is the Savonius-type wind turbine which is simple in concept and construction and is utilized to convert the force of the wind into torque. The principle involved in the Savonius-type wind turbine includes the wind striking an object, wherein the kinetic energy of the wind is transferred to affect the object by either forcing the object to resist the force of the wind (in the case of a building) or causing the kinetic energy of the wind to move the object (sailboats, etc.).

Certain Savonius-type wind turbine designs capture the energy of the wind by using semicircular vanes that are offset from the center of rotation of the wind turbine. The result is that the wind energy is converted into torque about the center of rotation of the wind turbine. The Savonius-type wind turbine operates on the principle of drag differential from one side of the wind turbine to the other. The drag differential creates a high drag side that is powered by the interaction of the kinetic energy of the wind striking the vane such that energy is transferred to and power is absorbed in the wind turbine. The opposite side of the wind turbine is a low drag side or a recovery side, which presents a lower drag profile as the wind turbine travels into the incoming wind, and thus, the wind turbine absorbs less energy. These differences provide a drag differential and an energy absorption differential that results in a torque that causes rotation of the wind turbine about a rotational axis or shaft.

This Savonius-type semicircular vane design has proven to be functional. However, the amount of torque the semicircular vane design can produce is limited by the length of the lever arm (the distance from the center of rotation to the center of pressure absorption) and the amount of drag differential caused by the shape of the front and the rear of the vanes. The amount of torque created is also limited by the velocity of the wind, as the Savonius-type wind turbine is a drag type object not an airfoil. The vanes of the Savonius-type wind turbine can only spin at the same speed or a lower speed than the wind speed and not faster than the wind speed, such as in an airfoil application.

It would be desirable to create a Savonius-type wind turbine that is more efficient than conventional Savonius-type wind turbines by increasing the drag differential between opposite sides of the wind turbine to increase the amount of torque generated.

SUMMARY

The present disclosure provides a wind turbine comprising a support structure for supporting a rotatable, substantially vertical hub wherein at least one substantially horizontal support arm is connected to the hub, and at least one wind trap is connected to each support arm. Each wind trap supports at least one petal that may move between an open position, wherein wind is not blocked by the at least one petal, and a closed position, wherein the at least one petal blocks the wind thereby causing the wind to move each wind trap and rotate the hub. Each wind trap has a base wherein the at least one petal is hingedly connected to the base for movement between the open position and the closed position. The base of each wind trap has a plurality of sides, wherein each petal has a substantially triangular shape hingedly connected to a side of the base of each wind trap. The base of each wind trap may also have a faceted substantially arcuate frame, wherein each of the at least one petal has a substantially trapezoidal shape or a substantially triangular shape.

The wind turbine of the present disclosure may also have a front framework and a rear framework connected to the base of each wind trap for supporting a guide rod extending along a longitudinal axis of each wind trap. A synchronizer may be slideably connected to the guide rod for movement between the open position and the closed position. At least one push rod is pivotally connected to the synchronizer and each petal for moving each petal between the open position and the closed position upon movement of the synchronizer. The front framework may have a plurality of support rods extending from a front side of each wind trap wherein one end of each of the support rods is connected to the base of each wind trap, and the opposite end of each of the support rods is connected to a first bushing extending along the longitudinal axis of each wind trap to form a substantially pyramidal configuration. The rear framework may have a plurality of support rods extending from a rear side of each wind trap wherein one end of each of the support rods is connected to the base of each wind trap, and the opposite end of each of the support rods is connected to a second bushing extending along the longitudinal axis of each wind trap to form a substantially pyramidal configuration. The guide rod is received by and extends between the first bushing and the second bushing.

The wind turbine of the present disclosure may also have a scoop having side walls extending from the base of each wind trap at substantially right angles wherein the side walls are substantially perpendicular to one another to form a substantially diamond structure. In another embodiment, the scoop may have side walls extending from the base of each wind trap at substantially obtuse angles wherein the side walls are substantially perpendicular to one another to form a substantially diamond structure. In yet another embodiment, the scoop may have a cylindrically shaped wall extending from the base of each wind trap.

The wind turbine of the present disclosure may also have each horizontal support arm pivotally connected to the hub, wherein a post is connected to and extends upward from the support structure. A lowering arm is connected to each wind trap and pivotally connected to the post such that the horizontal support arm can be positioned in an operating position, wherein the support arm extends substantially horizontal to allow the wind turbine to operate, and a maintenance position, wherein the support arm and the lowering arm pivot downwards to allow the wind trap to lower for performing maintenance on the wind trap and storing the wind trap in a protective structure.

The wind turbine of the present disclosure may also provide a generator operably connected to the hub, wherein the hub operatively drives the generator to generate power.

BRIEF DESCRIPTION OF THE DRAWINGS

The disclosure is best understood from the following detailed description when read in conjunction with the accompanying drawings. It is emphasized that, according to common practice, the various features of the drawings may not be to-scale and may be arbitrarily expanded or reduced for clarity.

FIG. 16 is a sectional view of the alternative chrysanthemum wind trap design of the wind turbine of the present disclosure in the open position.

DETAILED DESCRIPTION

The present disclosure describes a wind turbine having a Savonius-type structure that provides a higher drag differential between sides of the wind turbine than other known designs in order to provide a more efficient wind turbine. The wind turbine utilizes a number of wind traps that are mounted to a number of substantially horizontal arms which are connected to a rotatable hub having a substantially vertical axis mounted to a tower. The hub is connected to a generator for the creation of power upon rotation of the hub. The hub is driven by the wind engaging the horizontally disposed, substantially diamond shaped wind traps wherein each of the wind traps has a number of internal synchronized petals that move between an open position, wherein wind is allowed to pass through the wind traps without the wind being captured by the wind traps thereby creating a low drag configuration, and a closed position, wherein wind is captured by the wind traps to drive and rotate the wind turbine thereby creating a high drag position. The wind turbine of the present disclosure is a "prime mover" and may be utilized to power various machines other than electrical generators, such as compressors and pumps. In addition, the highly visible design of the wind turbine of the present disclosure assists in preventing accidental bird strikes.

Figure 1:
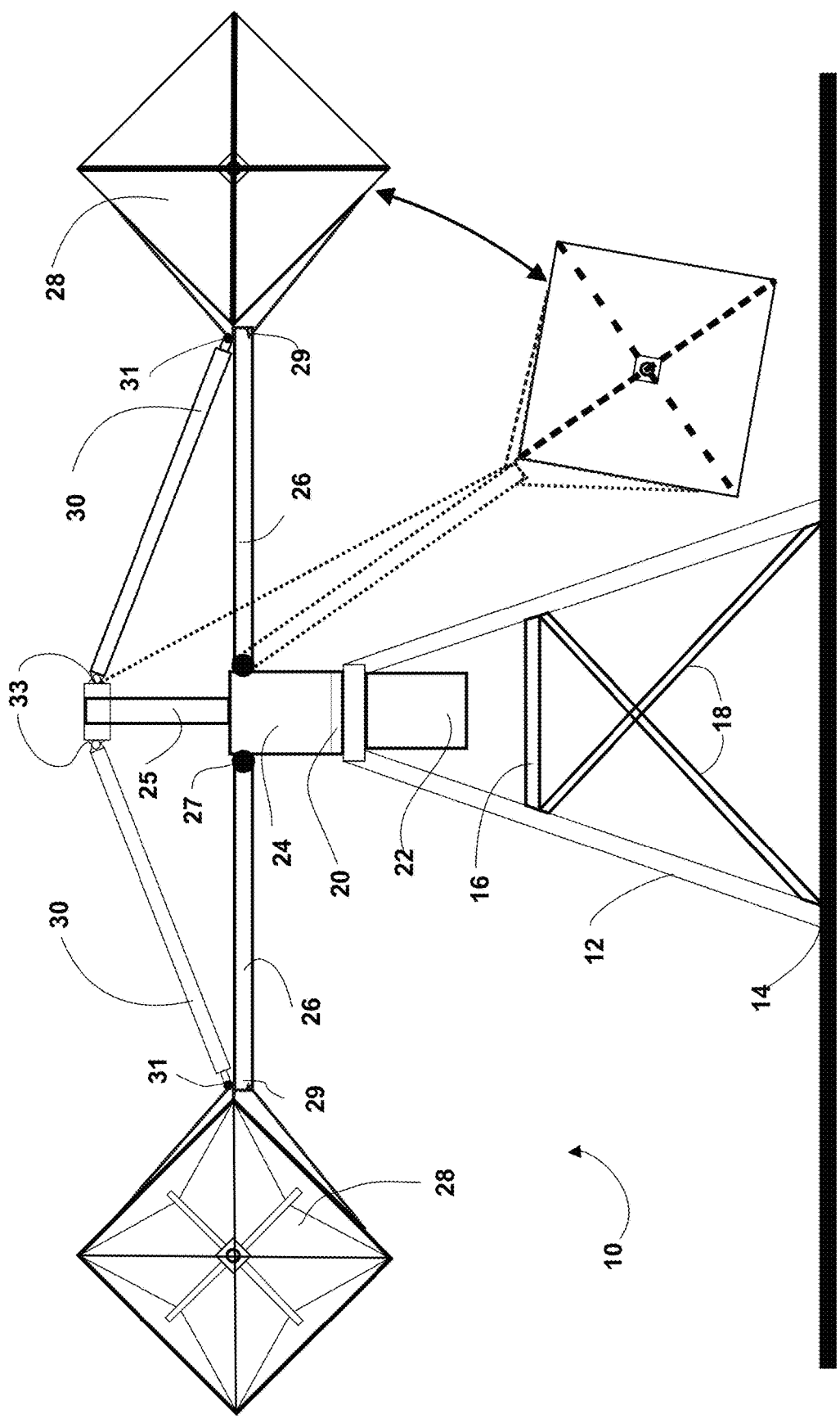
FIG. 1 is a schematic diagram of the wind turbine of the present disclosure.
Figure 2:
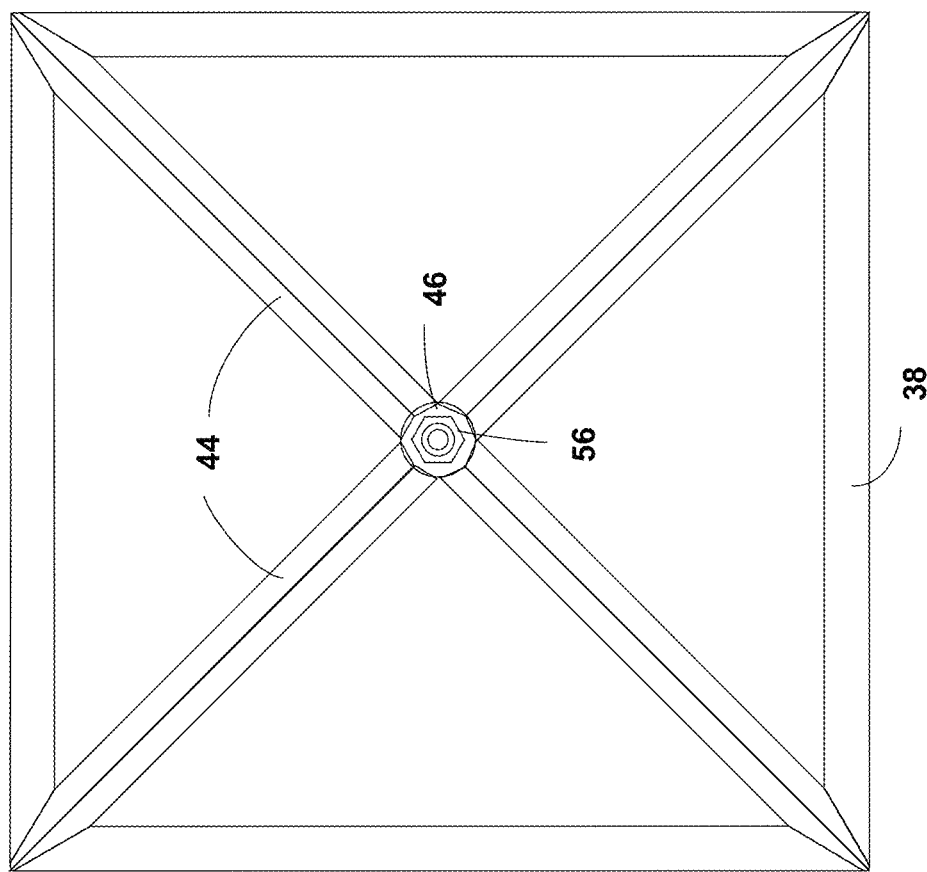
FIG. 2 is a front plan view of the framework of the wind trap of the wind turbine of the present disclosure.

As seen in FIG. 1, a wind turbine 10 of the present disclosure may be supported by a substantially triangular support frame 12 having a base 14 connected or mounted to a foundation or support structure (not shown) which may include the ground, cement, steel plates, or some other conventional foundation or support structure. The substantially triangular support frame 12 narrows as the support frame 12 extends upward away from the support structure. Cross members 16 may be connected to outer legs 18 of the support frame 12 in order to further support and strengthen the support frame 12. The support frame 12 is relatively short compared to conventional wind turbine support frames thereby providing a stable, balanced and easy to construct structure having a low center of gravity, wherein the shorter height allows for easier access to the wind turbine 10 during maintenance and service. The support frame 12, cross members 16, and outer legs 18 may be fabricated from high strength metals, such as steel or aluminum.

In order to support the wind turbine 10, the support frame 12 has a substantially flat landing or base 20 at the top of the support frame 12. A generator 22 is mounted to an underside of the landing 20 at the top of the support frame 12, and a substantially cylindrical, rotatable hub 24 is mounted to the top side of the landing 20 opposite the generator 22. The hub 24 extends substantially vertically upward from the landing 20 and is mounted on two large bearing races (not shown) which ride on a substantially vertical shaft or spindle 25 connected to the landing 20, wherein the rotating hub 24 rotatably drives the generator 22 to create power. A disc brake (not shown) may be attached to the hub 24 to prevent the rotation of the wind turbine 10 when desired, for instance, when conducting maintenance on the wind turbine 10 or during high wind conditions. A speed increasing gear box (not shown) may also be operatively connected between the hub 24 and the generator 22 so as to increase the input speed from the hub 24 to the generator 22.

To rotatably drive the hub 24, a plurality of substantially horizontal support arms 26 each have one end 27 that is hingedly or pivotally connected to and extends radially outward from the outer perimeter of the hub 24. An opposite end 29 of each of the support arms 26 is connected to a wind trap 28. Each of the support arms 26 has a matching lowering arm 30 that is similarly connected to the wind trap 28 at one end 31 of the lowering arms 30. An opposite end 33 of each of the lowering arms 30 are connected to the spindle 25 which extends substantially vertically upward from the hub 24. Each of the lowering arms 30 extend upward at an acute angle from the support arms 26. The opposite end 33 of each of the lowering arms 30 is hingedly or pivotally connected to the spindle 25. As shown in phantom lines and indicated by the arrow in FIG. 1, the hinged or pivotal connection of the support arms 26 to the hub 24 and the lowering arms 30 to the spindle 25 allows the support arms 26 and the lowering arms 30 to pivot between a maintenance position, wherein the wind traps 28 swing downward to allow for easy access to the wind traps 28 in situations where maintenance needs to be performed on the wind traps 28 or where the wind traps 28 can be lowered into protected shelters, and an operating position, wherein the support arms 26 and the lowering arms 30 are locked in the substantially horizontal position for operation of the wind turbine 10. The support arms 26 and the lowering arms 30 may be releasably locked in the horizontal position through the use of a lock (not shown). Supplemental power may be supplied to the wind turbine 10 in order to actuate the lock should the lock be electrically actuated. The supplemental power may also be utilized to actuate electric heaters (not shown) mounted on the wind traps 28 or other portions of the wind turbine 10 to melt any ice or snow that may form on the wind traps 28 or the remainder of the wind turbine 10.

In order to have the wind drive the wind turbine 10, the wind turbine 10 of the present disclosure may provide a plurality of substantially similar wind traps 28 wherein each one of the wind traps 28 is connected to the end 29 of each one of the support arms 26 and the lowering arms 30. It should be noted that any number of wind traps 28, support arms 26, and lowering arms 30 may be utilized. As seen in FIGS. 2-12, each of the wind traps 28 has a substantially square or diamond shaped base 37 having a front base 38 and a rear base 39 wherein the front base 38 and the rear base 39 may be connected adjacent one another to form the substantially square or diamond shaped base 37, or the front base 38 and the rear base 39 may be integrally connected to form the base 37. Each wind trap 28 may also have a front scoop or perimeter fence 34 extending from the front base 38 or front side of the wind trap 28 and/or a rear scoop 35 extending from the rear base 39 or rear side of the wind trap 28 wherein the front perimeter fence 34 and the rear scoop 35 extend outwardly in opposite directions from the base 37. The present disclosure also anticipates that the wind trap 28 may be utilized without the front perimeter fence 34 and/or the rear scoop 35. The front perimeter fence 34 and the rear scoop 35 may each have four walls 36 that extend substantially perpendicular from the front base 38 and the rear base 39, respectively, or the four walls 36 of the front perimeter fence 34 and the rear scoop 35 may extend further outward at an obtuse angle from the front base 38 and the rear base 39, respectively, or further inward at an acute angle from the front base 38 and the rear base 39, respectively, thereby creating a substantial funnel effect for directing wind toward and around the wind trap 28. The support arms 26 and the lowering arms 30 are connected to one corner of the base 37 of the wind trap 28. The wind trap 28 is mounted in a diamond position as opposed to a square in order to alter how the centrifugal loads act on the moving elements of the wind trap 28, i.e. moving petals 58 as will be described later in description, as the diamond shape evens out the loads over the wind trap 28 thereby making it simpler to operate the wind turbine 10 under higher centrifugal loads. Although the wind trap 28 is disclosed as substantially square or diamond shape, it should be noted that the wind trap 28 may comprise other geometric configurations. The front perimeter fence 34 and the rear scoop 35 are used to manage the air flow and minimize the drag as the wind trap 28 rotates and the reverse side of the wind trap 28 points into the oncoming wind.

Figure 3:
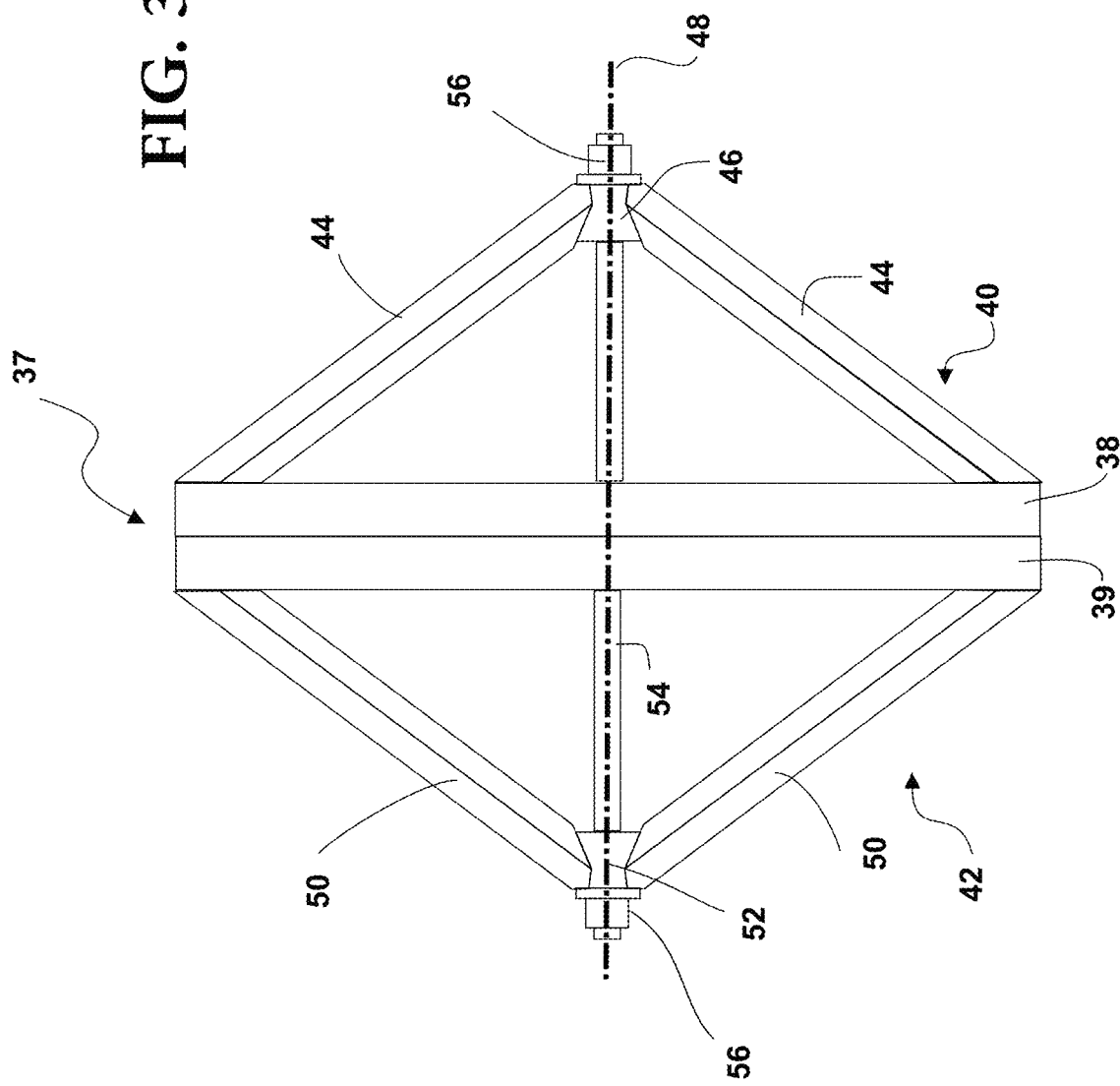
FIG. 3 is a side plan view of the framework of the wind trap of the wind turbine of the present disclosure.
Figure 4:
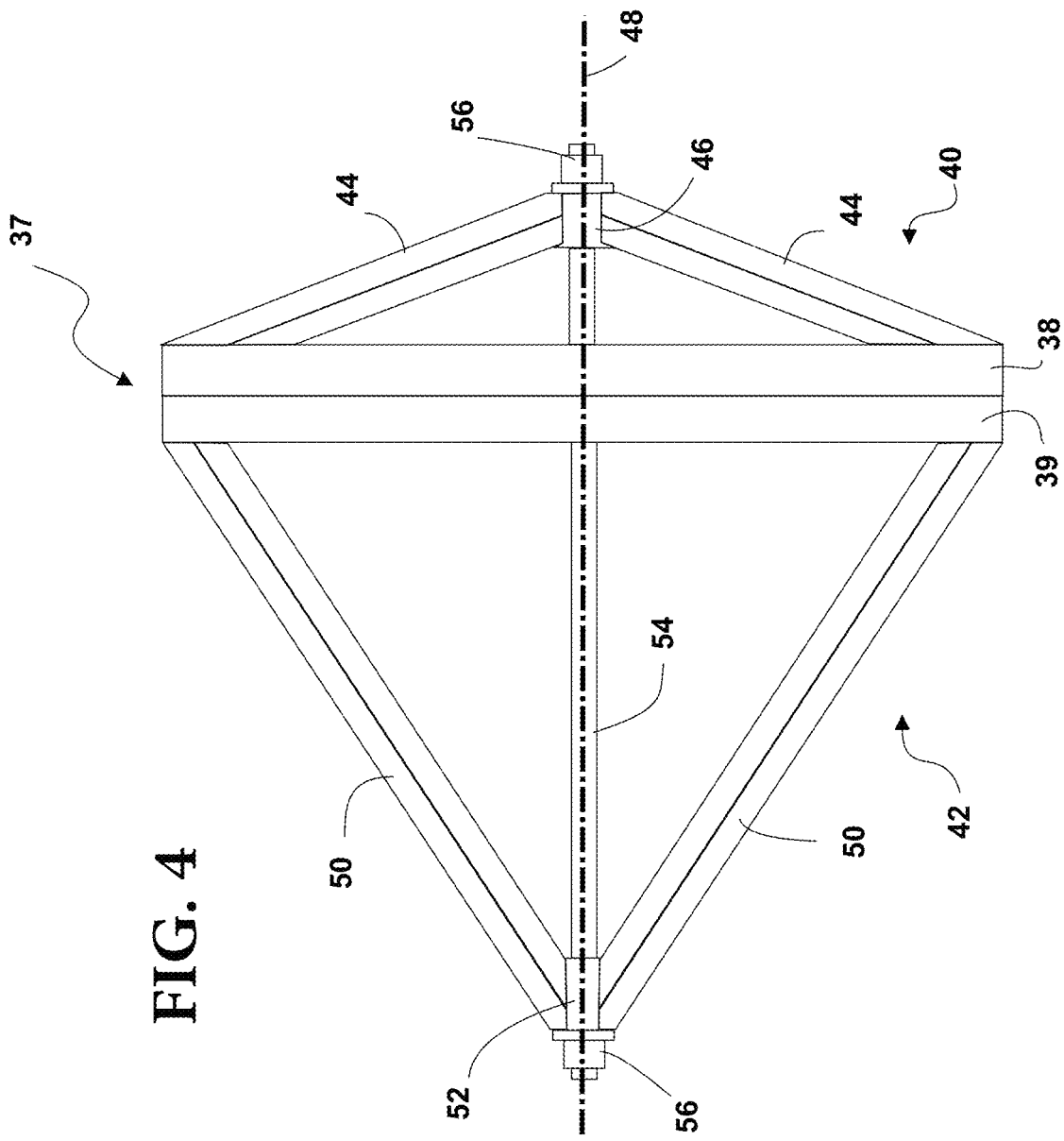
FIG. 4 is a side plan view of another embodiment of the framework of the wind trap of the wind turbine of the present disclosure.
Figure 5:
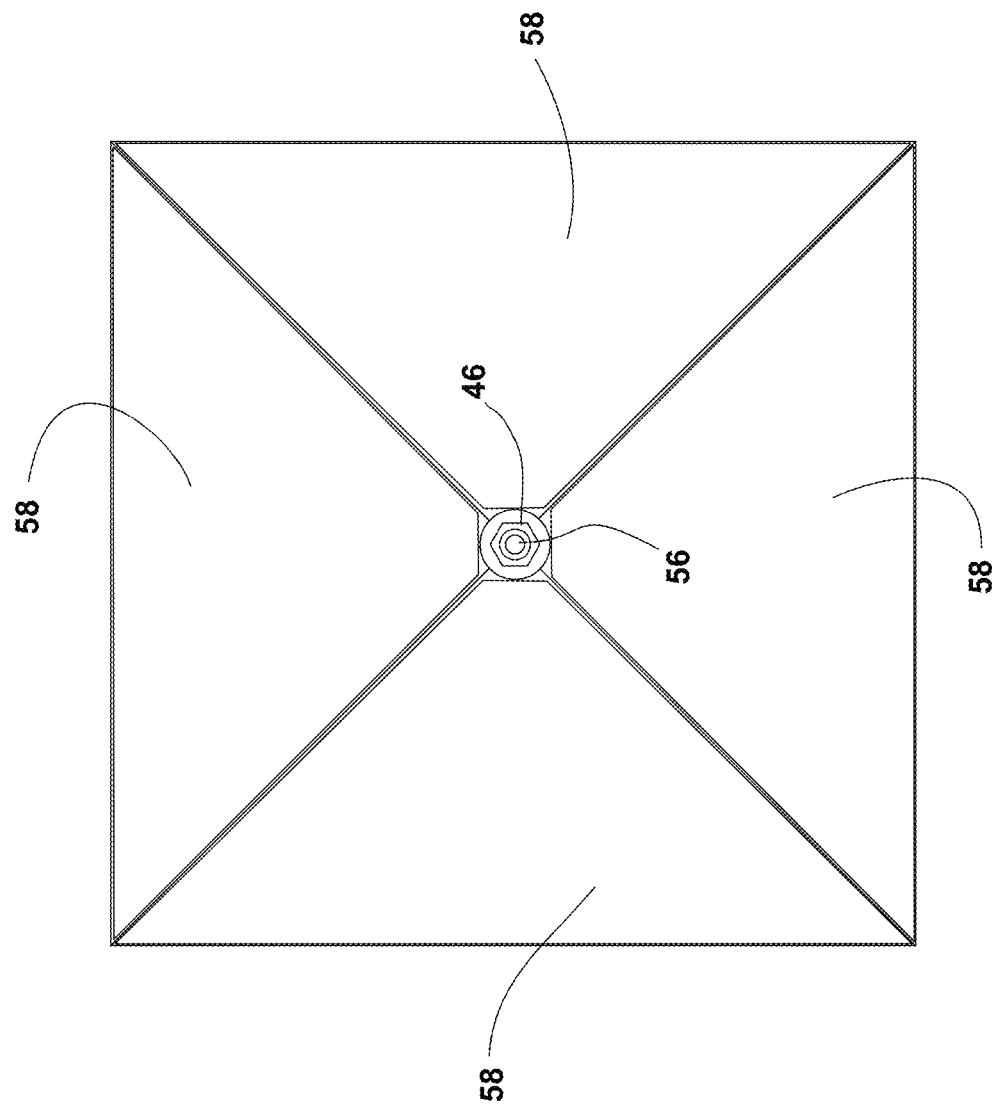
FIG. 5 a front plan view of the wind trap of the wind turbine of the present disclosure shown in a closed, high drag position.
Figure 6:
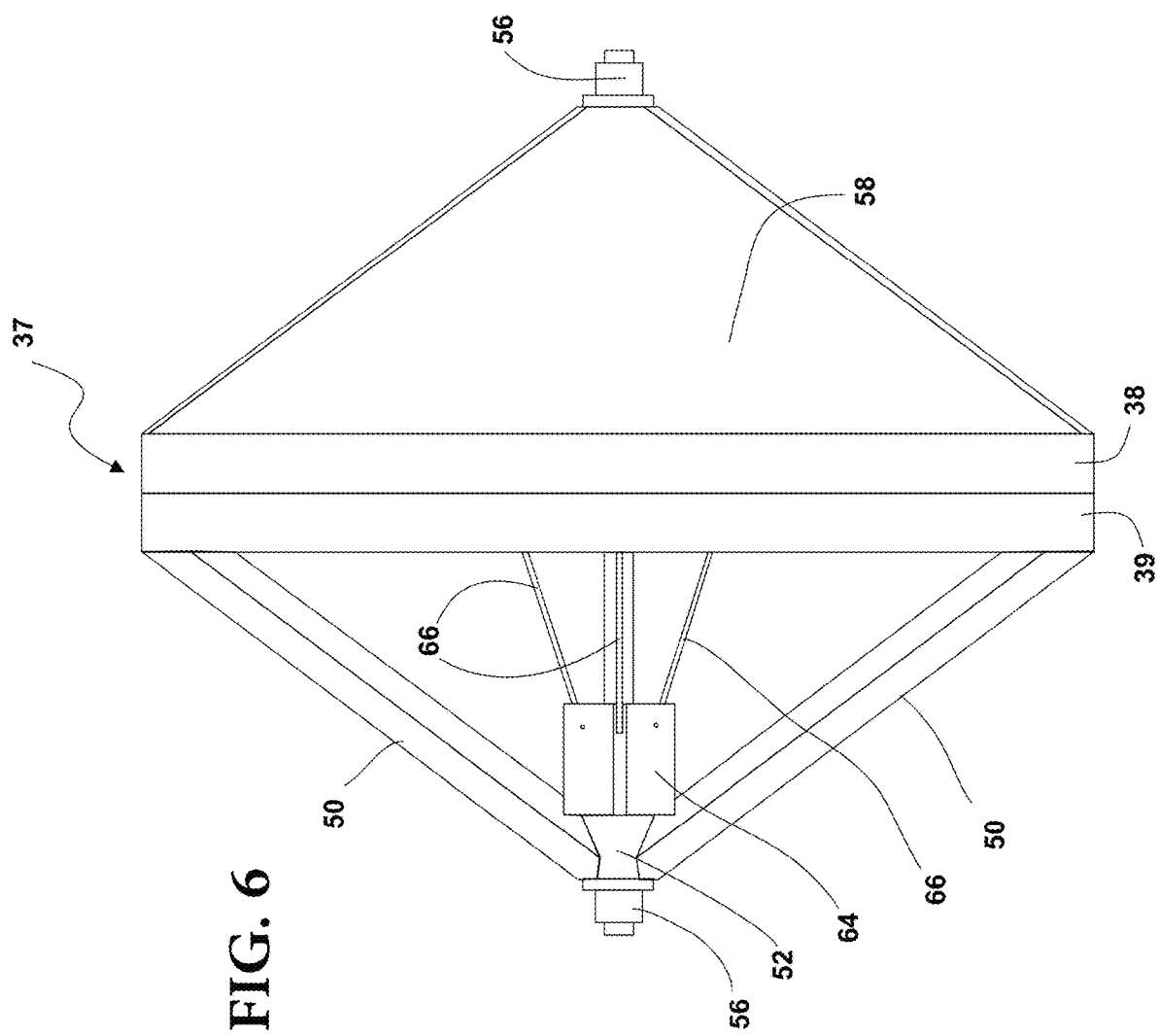
FIG. 6 is a side plan view of the wind trap of the wind turbine of the present disclosure shown in a closed, high drag position.
Figure 7:
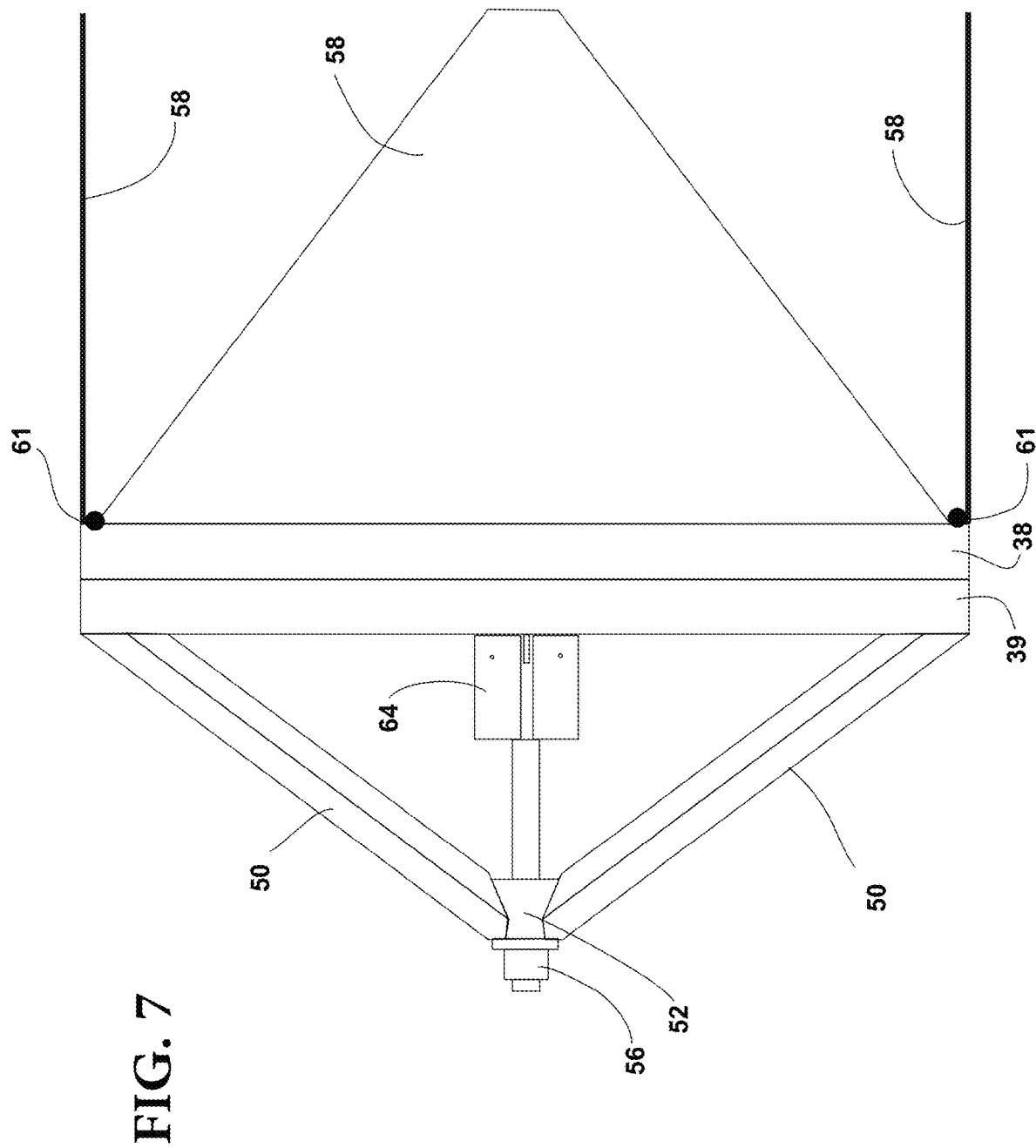
FIG. 7 is a side plan view of the wind trap of the wind turbine of the present disclosure shown in an open, low drag position.
Figure 8:
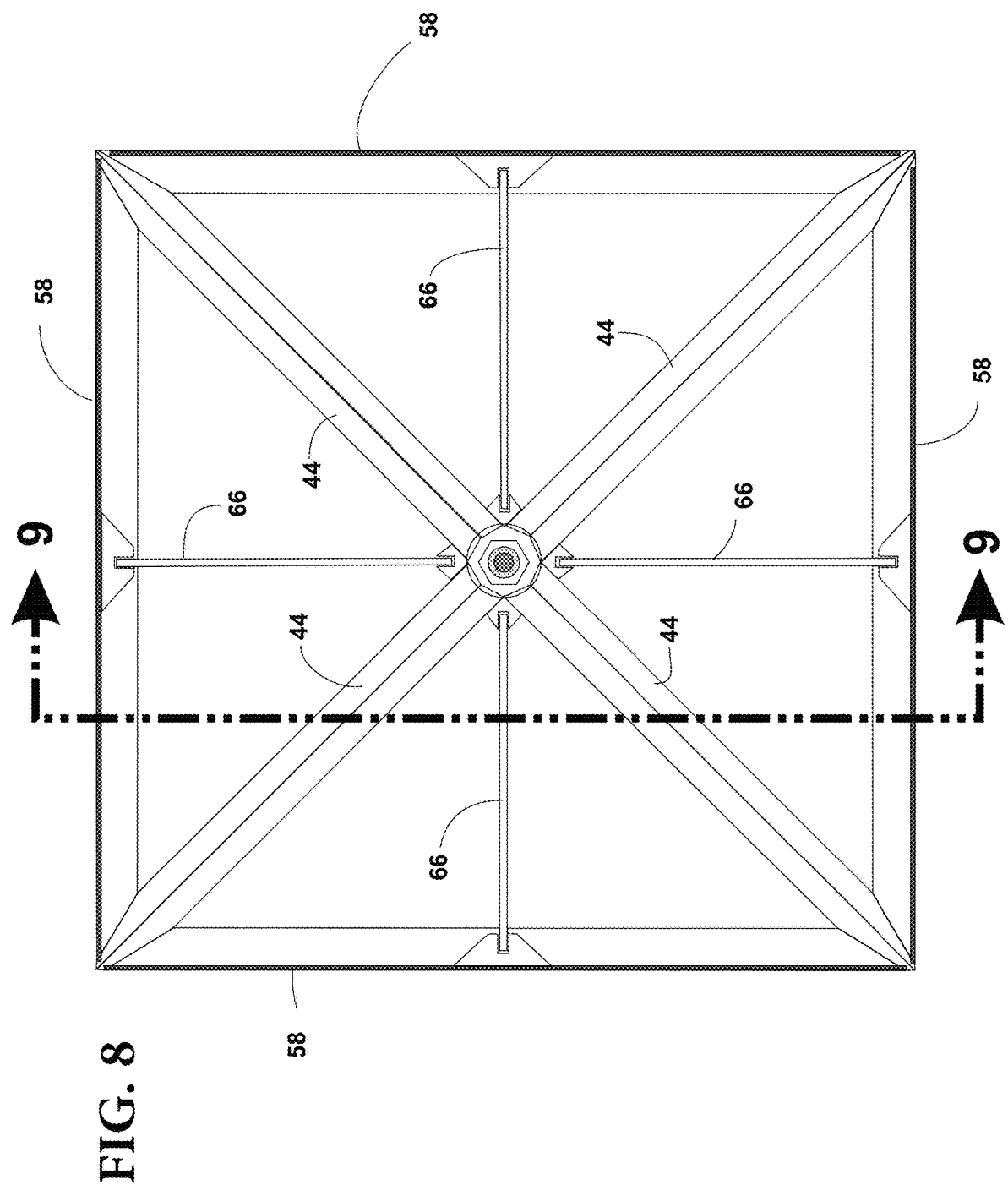
FIG. 8 is a front plan view of the wind trap of wind turbine of the present disclosure shown in the open, low drag position.
Figure 9:
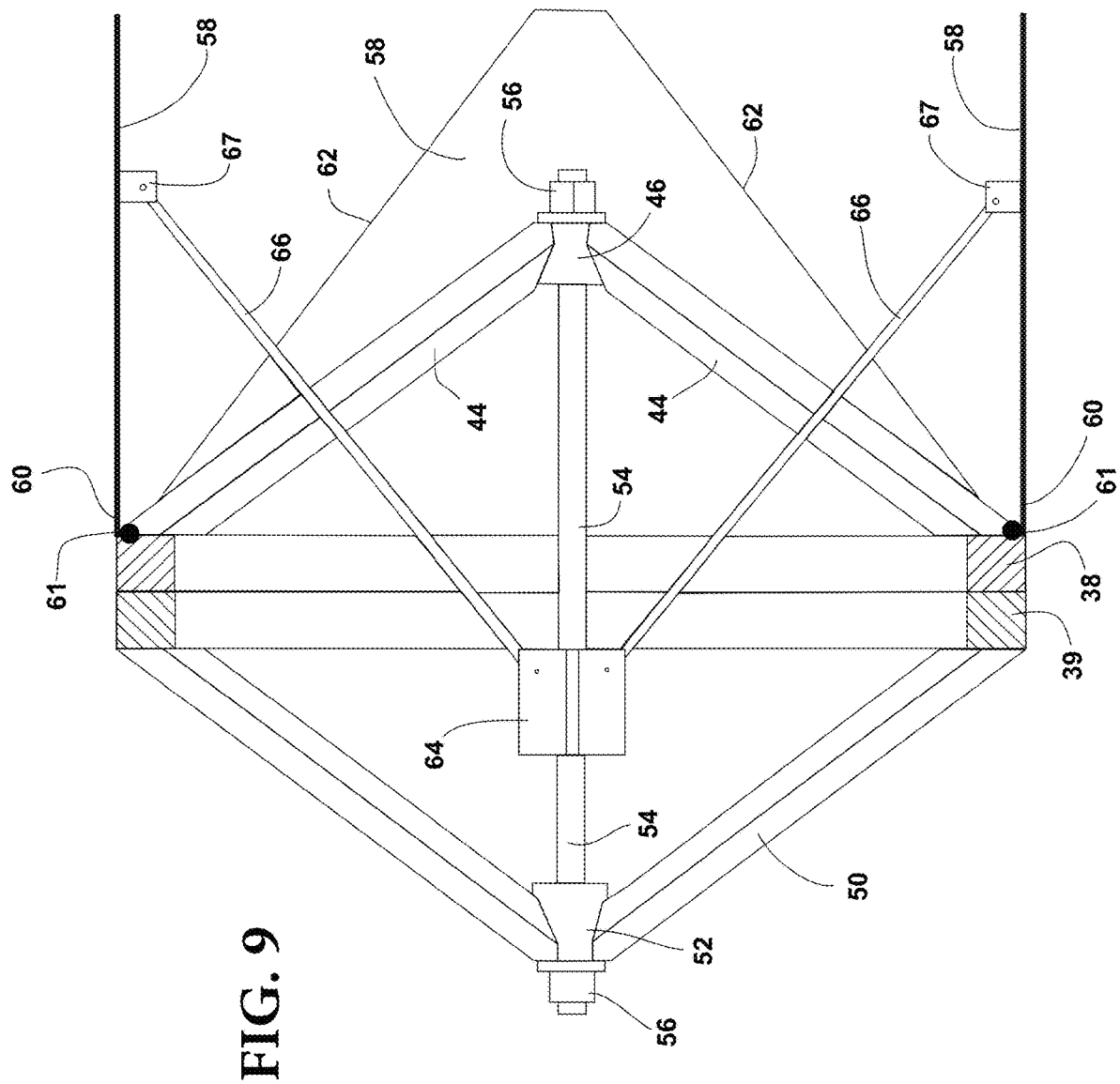
FIG. 9 is a cross-sectional view of the wind trap of the wind turbine of the present disclosure taken along lines 9-9 of FIG. 8.
Figure 10:
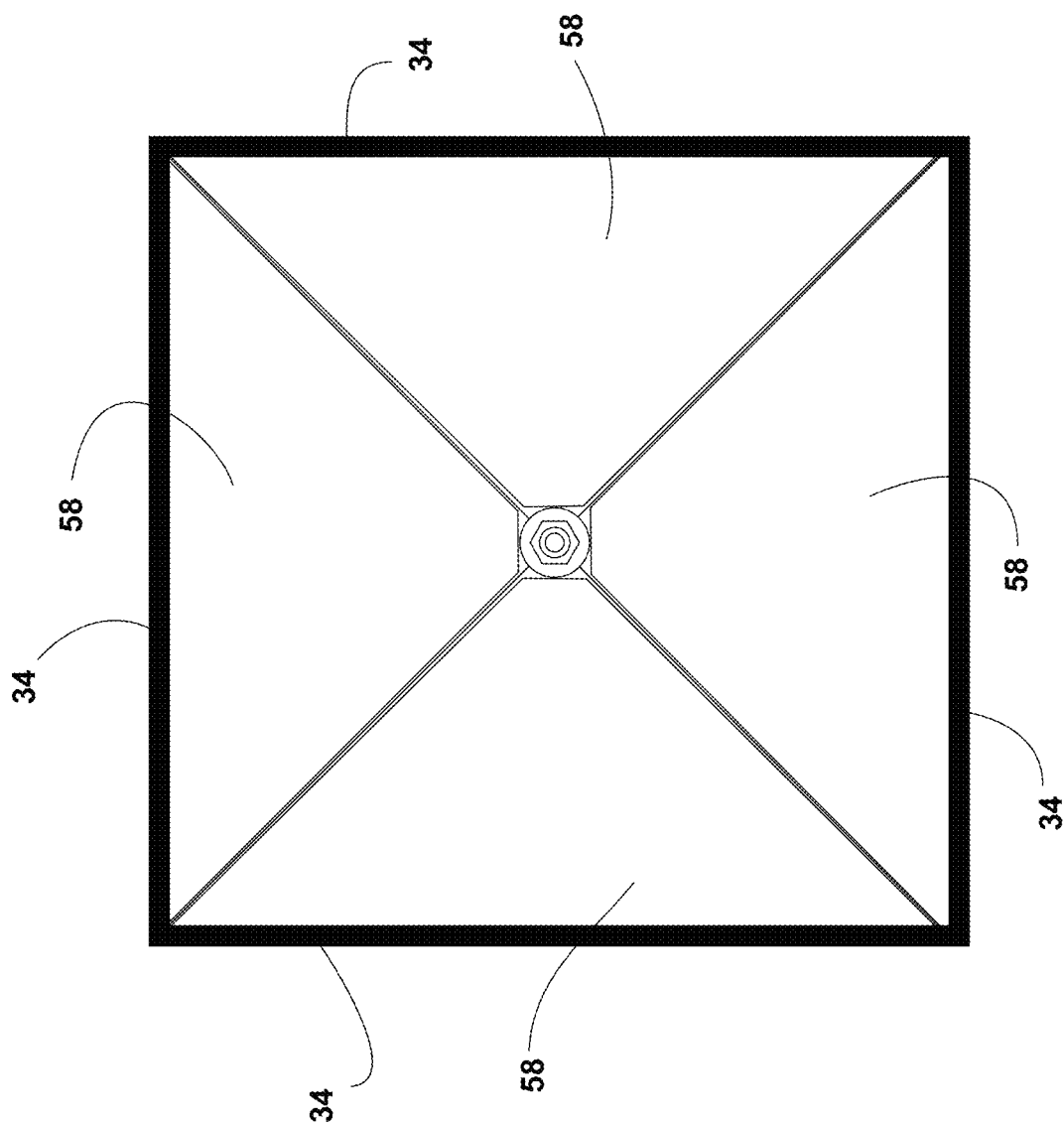
FIG. 10 is a front plan view of the wind trap of the wind turbine of the present disclosure having a front scoop or perimeter fence.
Figure 11:
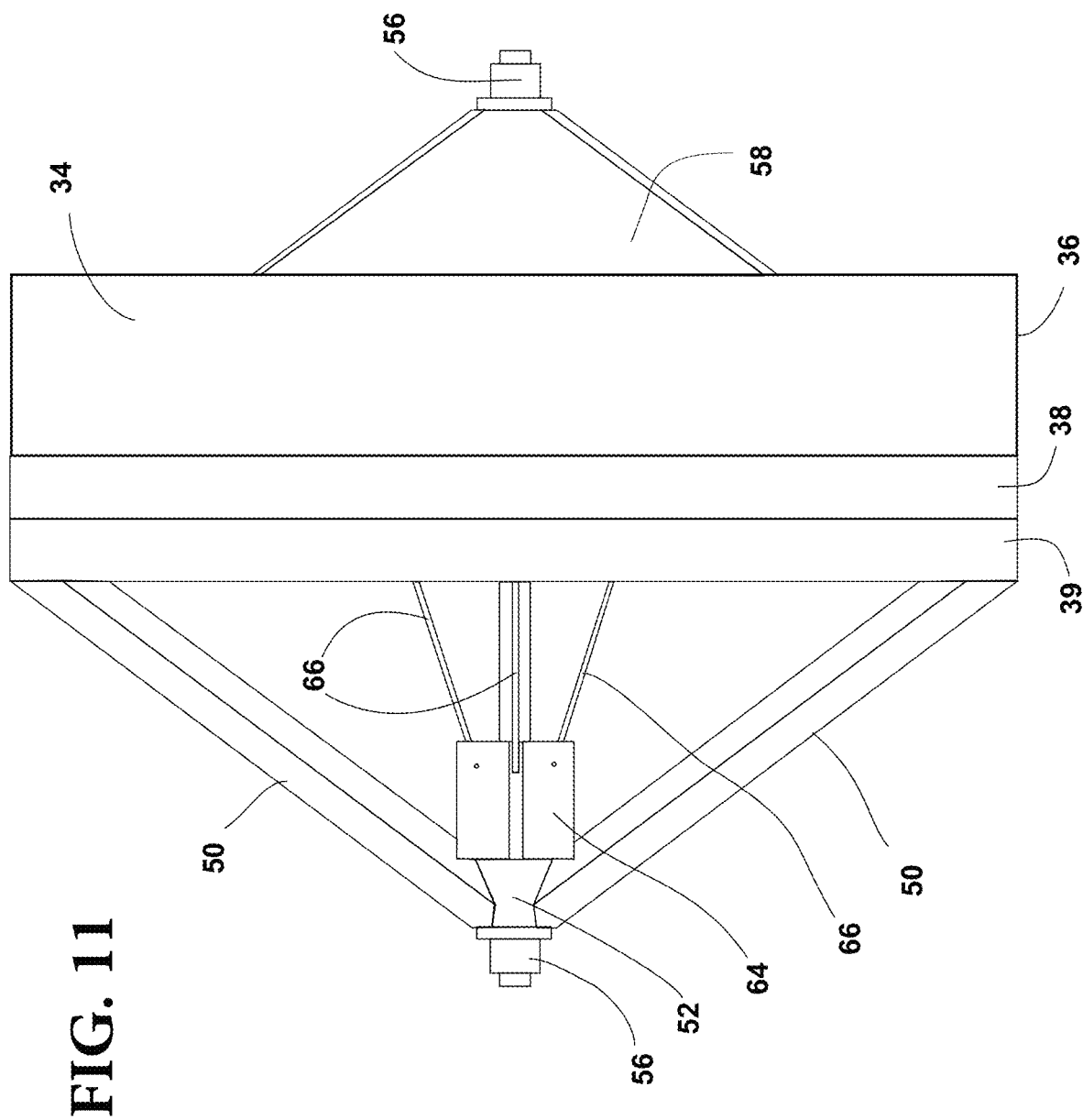
FIG. 11 is a side plan view of the wind trap of the wind turbine of the present disclosure having a front scoop or perimeter fence.
Figure 12:
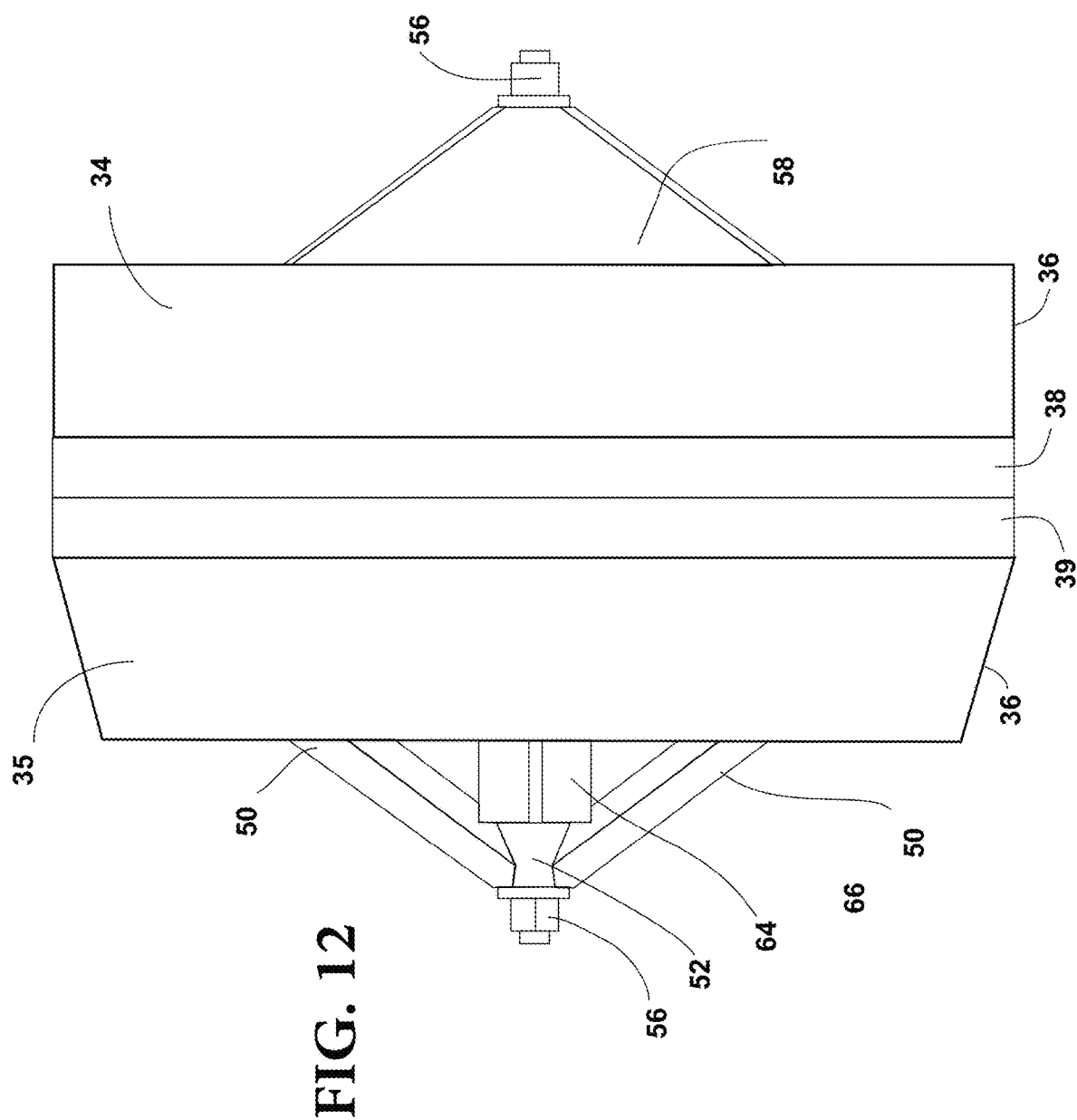
FIG. 12 is a side plan view of the wind trap of the wind turbine of the present disclosure having a front scoop or perimeter fence and a rear scoop.

The wind trap 28 further provides a front framework 40 and a rear framework 42 connected to and extending from the front base 38 and the rear base 39, respectively. The rear framework 42 extends from the rear base 39 in an opposite direction from the front framework 40, that is, the front framework 40 extends from the front base 38 or front side of the wind trap 28, and the rear framework 42 extends from the rear base 39 or rear side of the wind trap 28. Although the rear framework 42 and the front framework 40 are shown extending the same length from their respective bases 38, 39 of the wind trap 28, as shown in FIG. 3, the rear framework 42 and the front framework 40 may extend at different lengths from their respective bases 38, 39, as shown in FIG. 4. The front framework 40 has four rods or supports 44 having one end of the supports 44 connected to and extending outward and angularly inward from the corners of the front base 38 toward a longitudinal axis 48 of the wind trap 28. The opposite ends of the supports 44 are connected to a substantially cylindrical hub or bushing 46 located along the longitudinal axis 48 of the wind trap 28 wherein the ends of the supports 44 and the hub 46 may extend beyond the end of the walls 36 of the front perimeter fence 34 of the wind trap 28. The supports 44 form a substantially pyramidal shaped structure wherein the point of the pyramidal shaped structure is formed by the hub 46. The rear framework 42 also has four rods or supports 50 having one end of the supports 50 connected to and extending outwardly and angularly inward from the corners of the rear base 39 toward the longitudinal axis 48 of the wind trap 28. The opposite ends of the supports 50 are connected to a substantially cylindrical hub or bushing 52 located along the longitudinal axis 48 of the wind trap 28. The supports 50 also form a substantially pyramidal shaped structure wherein the point of the pyramidal shaped structure is formed by the hub 52, and wherein the pyramidal shaped structure of the rear framework 42 may be the same length or a different length than the pyramidal shaped structure of the front framework 40. A substantially cylindrical guide rod 54 having threaded ends extends along the longitudinal axis 48 of the wind trap 28 and extends between and is received by and through the hub 46 of the front framework 40 and the hub 52 of the rear framework 42. A nut 56 is threadably attached to each end of the guide rod 54 on the outside end of the hub 46 and the hub 52 to secure the guide rod 54 to the hubs 46, 52. The guide rod 54 may be fabricated from a light-weight, high-strength material, such as aluminum or stainless steel.

To create a drag differential for allowing wind to create torque about an axis, each of the wind traps 28 provide a set of four similar substantially triangular and flat petals 58 that are pivotally or hingedly connected to the front base 38, as seen in FIGS. 5-10. It should be noted that the present disclosure is not limited to four petals 58, but rather, various numbers of petals 58 may be utilized. In addition, the present disclosure is not limited to the petals 58 having a triangular, flat shape, but rather, other shapes and configurations of the petals 58 are anticipated. Each of the petals 58 has a base side 60 that is substantially parallel to and pivotally connected to a side of the front base 38 of the wind trap 28, wherein the base side 60 of each of the petals 58 is substantially equivalent in length to the side of the front base 38 of the wind trap 28. The pivotal connection between the front base 38 of the wind trap 28 and the base side 60 of each of the petals 58 is formed by a hinge 61 which may be fabricated from a living hinge, a mechanical hinge, a thermoplastic hinge, a rubber hinge, or some other form of hinge. Each of the petals 58 has two angled sides 62 that extend from the base side 60 at a substantially 45 degree angle such that the two angled sides 62 would meet at a point substantially half way along the base side 60 of the petal 58. It should be noted that the 45 degree angle between the two angled sides 62 and the base side 60 of the petal 58 will vary depending on the number of petals 58 utilized in the wind trap 28. Each of the four petals 58 is hingedly mounted to one of the sides of the front base 38 of the wind trap 28 and may pivotally move between an open position, wherein the petals 58 extend at an angle substantially perpendicular or just short of being perpendicular to the front base 38 of the wind trap 28 so as to allow wind to pass through the open front and rear frameworks 40, 42 of the wind trap 28 with limited drag while also allowing the petals 58 to catch the wind and close when the wind flows in the opposite direction, and a closed position, wherein the petals 58 pivot inward toward the center of the wind trap 28 until the angled sides 62 of the petals 58 engage the supports 44 of the front framework 40 so as to adjacently align and close the open front framework 40 of the wind trap 28 and prevent the wind from passing through the front framework 40 of the wind trap 28. The supports 44 and/or the petals 58 may have a cushion material (not shown) connected thereto, wherein the cushion material reduces the impact loads associated with the petals 58 engaging the supports 44 and provides a seal for preventing wind from passing between the supports 44 and the petals 58 when in the closed position. When in the closed position, the wind effectively applies a force against the petals 58 of the wind trap 28 thereby forcing the wind traps 28 to rotate and generate torque about the hub 24. In addition, the front framework 40 and the petals 58 form a solid substantially pyramidal shaped structure which establishes the energy absorbing or windward side of the wind trap 28 with the peak of the pyramidal shaped structure pointing into the wind. When in the open position, the petals 58 pivot away from the front framework 40 thereby establishing a recovery side of the wind trap 28 such that the wind moves the petals 58 to the open position thereby allowing wind to pass through the open front and rear frameworks 40, 42 of the wind trap 28 thereby generating little drag. Thus, the petals 58 move between the open position and the closed position simply through the force of the wind without the assistance of any actuation or power-driven mechanism. The petals 58 may be made of any light weight, stable material, such as aluminum, wood, or foam-composite laminated panels.

In order to move the petals 58 between the open and closed positions, a synchronizer 64 is slideably mounted onto the guide rod 54. The synchronizer 64 may have a substantially rectangular configuration with a bore (not shown) extending through the synchronizer 64, wherein the guide rod 54 extends through the bore of the synchronizer 64 such that the synchronizer 64 can freely slide along the guide rod 54. The synchronizer 64 may be fabricated from a metallic, composite, or wood material and may contain a bearing (not shown) made from a bushing or linear bearing that may engage and easily slide along the guide rod 54. Four push rods 66 each have one end pivotally connected to the synchronizer 64, wherein the push rods 66 are substantially equally spaced about the synchronizer 64. The number of push rods 66 correspond with the number of petals 58. The push rods 66 may be pivotally connected to the synchronizer 64 through the use of a mechanical hinge or pivot pin wherein a flexible boot (not shown) may be utilized to cover the pivotal connection between the push rods 66 and the synchronizer 64. The opposite end of each of the push rods 66 is pivotally connected to one of the petals 58, wherein a mechanical hinge 67 may be centrally mounted on the inside surface of each of the petals 58 such that the opposite end of each of the push rods 66 is pivotally connected to the hinge 67. A flexible boot (not shown) may be utilized to cover the hinge 67 between the petals 58 and the push rods 66 in order to prevent debris from entering the hinge 67 and affecting the movement of the petals 58. Each of the push rods 66 may be fabricated from a metallic or organic material, such as wood.

As the synchronizer 64 slides linearly along the guide rod 54, the push rods 66 pivot on the synchronizer 64 and the petals 58, allowing the petals 58 to pivotally move along the hinged connection between the front base 38 of the wind trap 28 and the base side 60 of the petals 58. Thus, when the synchronizer 64 is fully extended along the guide rod 54 toward the hub 46 of the front framework 40, the push rods 66 pivotally move the petals 58 in unison to the open position, wherein the petals 58 extend substantially perpendicular or just less than perpendicular from the front base 38 of the wind trap 28 such that the wind is allowed to freely pass through the open front and rear frameworks 40, 42 of the wind trap 28. When the synchronizer 64 is fully retracted along the guide rod 54 toward the hub 52 of the rear framework 42, the push rods 66 pivotally move the petals 58 in unison to the closed position where the petals 58 pivot inwardly toward one another until the petals 58 adjacently engage the supports 44 of the front framework 40 to effectively close the open front framework 40 of the wind trap 28 thereby preventing the wind from passing through the wind trap 28. This, of course, allows the wind to apply a force to the petals 58 which effectively pushes the wind traps 28 in the direction of the wind thereby allowing the wind traps 28 to rotate and generate torque about the hub 24. It is anticipated that a lock (not shown) may be provided for locking the petals 58 of the wind traps 28 in the open position to prevent damage of the wind turbine 10 in gusty wind conditions. As previously noted, supplemental power may be provided to the wind turbine 10 to allow for electrical actuation of the lock.

Figure 13:
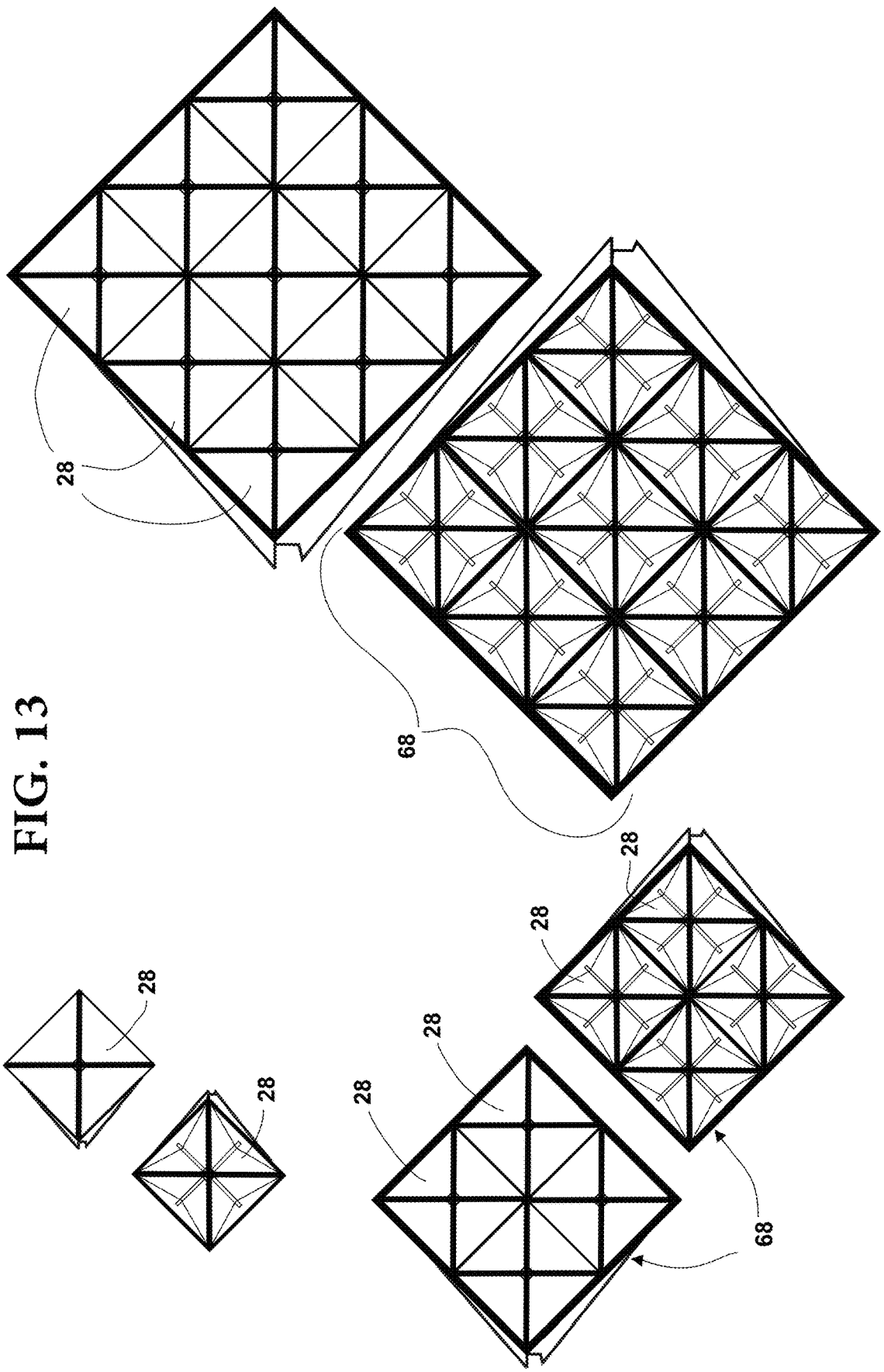
FIG. 13 is a plan view showing single and groups of wind traps combined in a wind turbine of the present disclosure.

In another embodiment of the disclosure, multiple wind traps 28 may be mounted adjacent one another to form a larger wind trap 68, as shown in FIG. 13. The individual, substantially square or diamond shaped wind traps 28 are adjacently positioned to form the same diamond shaped configuration as the single wind trap 28. Thus, in order for the same configuration to be maintained, the wind traps 28 may be grouped in numbers of four or nine wind traps 28. However, it is anticipated that various configurations of the larger wind trap 68 may be created through various numbers and shapes of the individual wind traps 28. By adding multiple wind traps 28 to one configuration, additional torque may be generated by the wind turbine 10. Each wind trap 28 of the larger wind trap 68 would still operate in the same manner as previously described.

Figure 14:
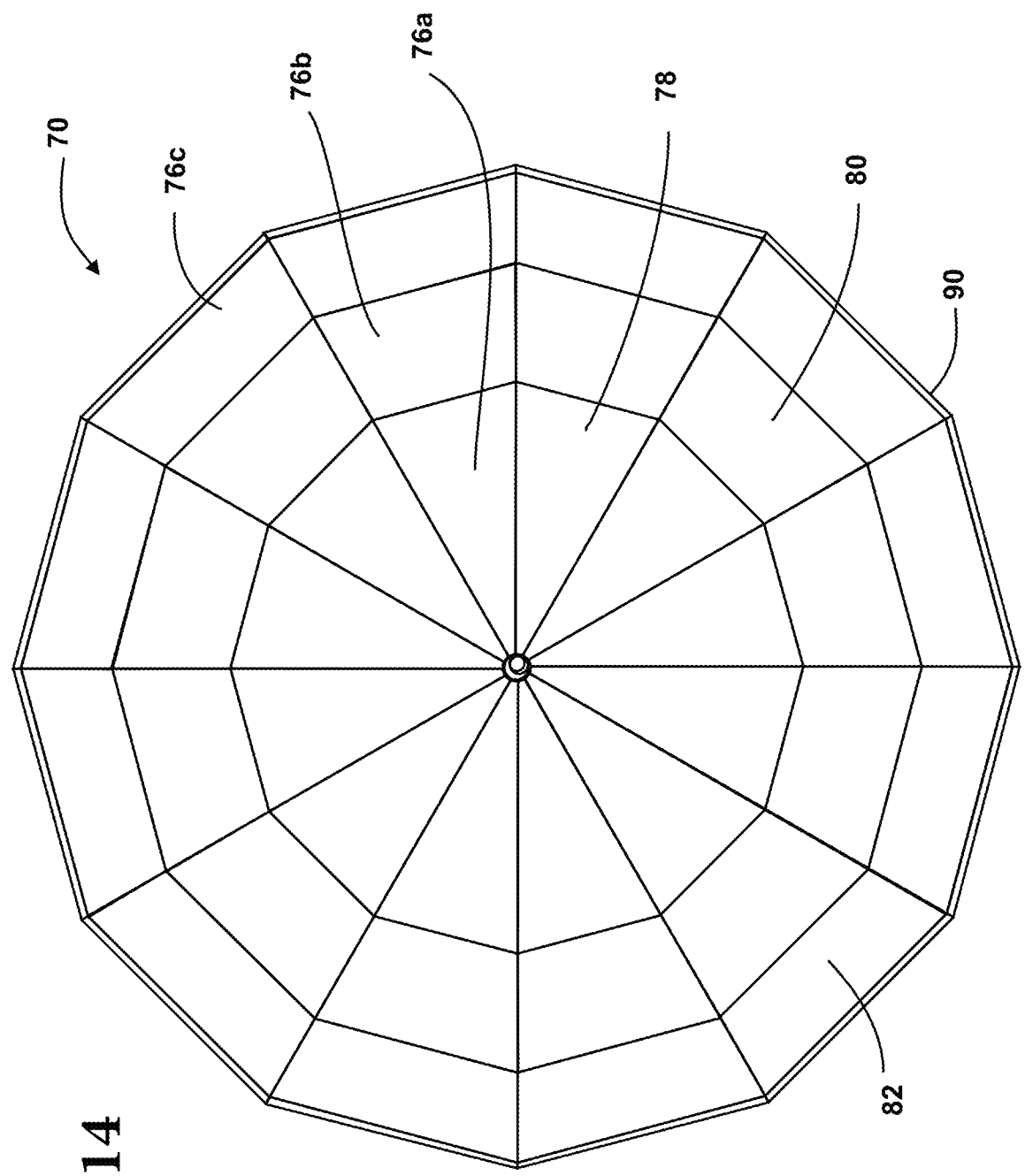
FIG. 14 is a front plan view showing the alternative chrysanthemum wind trap design of the wind turbine of the present disclosure in the closed position.
Figure 15:
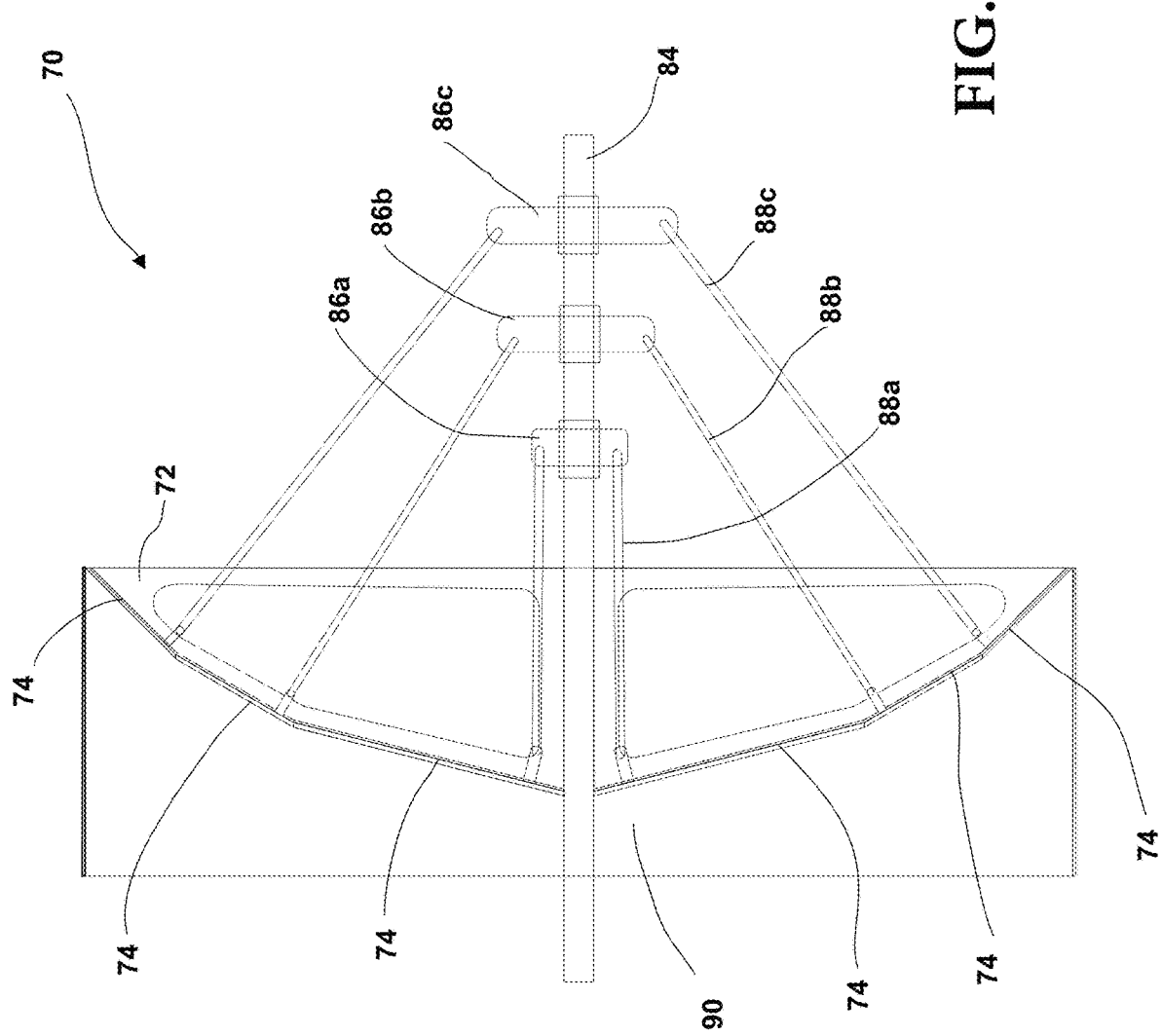
FIG. 15 is a sectional view of the alternative chrysanthemum wind trap design of the wind turbine of the present disclosure in the closed position.

In yet another embodiment of the disclosure, the wind turbine 10 may provide a wind trap 70 having a "chrysanthemum" shaped design, as shown in FIGS. 14-16. That is, the wind trap 70 may have a base 72 that is substantially arcuate or bowl shaped wherein substantially flat surfaces 74 of the base 72 are connected or adjoined to form a faceted arcuate shape of the base 72. To accommodate for the bowl-shaped base 72, petals 76a, 76b, 76c form adjacent concentric rings in order to block the wind in the closed position. Each of the petals 76a, 76b, 76c has substantially the same surface area such that the wind will apply substantially the same force upon each of the petals 58. Thus, an inner ring 78 of petals 76a is formed, wherein the petals 76a have a substantially triangular shape such that a solid, substantially circular or multi-sided polygon is formed when the petals 76a are adjacently aligned in the closed position. A second ring 80 of petals 76b is formed concentrically adjacent to an outer circumference of the inner ring 78. The petals 76b of the second ring 80 have a substantially trapezoidal shape such that the top, shorter side of the trapezoidal shape aligns with the base side of the triangular shape of the petals 76a. When the petals 76b are in the closed position, the petals 76b form a solid ring around the outer circumference of the inner ring 78. A third outer ring 82 of petals 76c is formed similar to the second ring 80. That is, the petals 76c have a substantially trapezoidal shape wherein the top, shorter side of the trapezoid shaped petals 76c align with the bottom, longer side of the trapezoid shaped petals 76b. When the petals 76c are in the closed position, the petals 76c form a solid ring around the outer circumference of the second ring 80. When all of the petals 76a, 76b, 76c are in the closed position, the petals 76a, 76b, 76c form a solid, substantially circular or multi-sided polygonal structure. As previously described, the closed position of the petals 76a, 76b, 76c creates a high drag position wherein the wind moves the wind trap 70 to generate torque about the hub 24.

The petals 76 of the chrysanthemum design are actuated in a similar manner as previously described in the earlier embodiments. Thus, the wind trap 70 may provide a framework (not shown) connected to the base 72 of the wind trap 70 for supporting a guide rod 84. Instead of having one synchronizer 64 as described in the previous embodiments, the wind trap 70 has three synchronizers 86a, 86b, 86c that are slidably mounted and spaced on the guide rod 84 through the use of bearings (not shown). The synchronizer 86a is pivotally connected to a plurality of push rods 88a which are pivotally connected to the petals 76a, the synchronizer 86b is pivotally connected to a plurality of push rods 88b which are pivotally connected to the petals 76b, and the synchronizer 86c is pivotally connected to a plurality of push rods 88c which are pivotally connected to the petals 76c. Although the petals 76a, 76b, 76c move independently between the open and closed position in response to the wind, the petals 76a, 76b, 76c generally move simultaneously since the same wind is applied to all of the petals 76 which have similar surface areas thereby generating similar forces on the petals 76a, 76b, 76c. Lastly, we note that a substantially circular perimeter fence 90 may be connected to the base 72 for gathering and directing the wind.

In operation, the wind turbine 10 may be located in a geographic area that is known for having relatively constant or high winds. As previously discussed, the frame 12 of the wind turbine 10 extends upward and supports the hub 24 and the generator 22 wherein the support arms 26 extend horizontally outward from the hub 24 and are connected to the wind traps 28. The wind traps 28 are connected to the support arms 26 in a substantially diamond configuration wherein the four petals 58 extend from the substantially square front base 38 and may close adjacent one another in the closed position to form a four-sided pyramid on the energy absorbing or windward side of the wind trap 28 such that the peak of the pyramidal shape is pointing into the wind. As the wind blows against the solid pyramidal configuration of the wind trap 28, the wind trap 28 moves and rotates the hub 46 so as to create torque thereby driving the generator 22. As the wind turbine 10 rotates, the wind trap 28 must recover against the wind, and thus, the reverse side of the wind trap 28 is presented to the wind. When this occurs, the wind forces the petals 58 to move to the open position such that the push rods 66 that are connected to the petals 58 force the synchronizer 64 to slide along the guide rod 54. When the petals 58 are in the open position, the wind trap 28 becomes a hollow framework whereby the wind can pass freely through the wind trap 28 thereby creating little drag. The net gain of energy generated from the wind impacting the wind trap 28 creates a force differential across the wind turbine 10 and forces the wind turbine 10 to rotate and generate torque that is transferred to the generator 22. The transformation of the petals 58 of the wind trap 28 is caused solely by the pressure of the wind and is natural and not activated nor powered by any other mechanism of the wind turbine 10 thereby allowing the wind turbine 10 to be self-starting with any wind.

It should be noted that the size and shape of the wind trap 28 determines the overall power caused by the drag available to the wind turbine 10. The drag of the recovery side will be deducted from the overall power available so that streamlining of the front and rear framework 40, 42 when the wind passes through the front and rear framework 40, 42 is necessary to increase the efficiency of the wind turbine 10. One advantage of the present disclosure over previous designs is that the wind turbine 10 can be scaled to much larger sizes to produce useable power outputs at relatively low wind speeds or larger power outputs at nominal wind speed. One non-limiting way to scale the wind turbine 10 to larger sizes is by grouping a number of smaller wind traps 28 adjacent one another to increase the frontal area and still maintain petal 58 response time, as shown in FIG. 13. Another way to increase the physical size of the wind traps 28 is to increase the number of sides on the wind traps 28, i.e. twelve or more sides (not shown). The determining factor as to the number of sides of the wind trap 28 is the speed or reaction time of the petals 58 which make up the sides of the wind trap 28. As the wind turbine 10 rotates, the petals 58 are open and are at a low drag configuration until about 10 to 20 degrees of rotation before the front of the wind trap 28 is substantially perpendicular to the wind flow. Once this point of rotation is reached, the wind flow forces the petals 58 to close, and the impact of the wind against the closed wind trap 28 transfers the energy of the wind into the wind trap 28 causing the wind turbine 10 to rotate.

Lastly, we note that a smoother power delivery may be obtained by increasing the distance of the support arms 26 or the distance of the wind trap 28 from the hub 24. By increasing the wing span or the length of the support arms 26, multiple wind traps 28 can be mounted to the single hub 24 such that the wind turbine 10 only needs to rotate a portion of a revolution before the next wind trap 28 is presented to the air flow. The larger wing span or longer support arms 26 also allows the wind traps 28 to be sufficiently spaced to prevent air flow interference between the wind traps 28 or what is commonly referred to as "wind shadowing".

Persons skilled in the art will understand that the various embodiments of the disclosure described herein and shown in the accompanying figures constitute non-limiting examples, and that additional components and features may be added to any of the embodiments discussed hereinabove without departing from the scope of the present disclosure. Additionally, persons skilled in the art will understand that the elements and features shown or described in connection with one embodiment may be combined with those of another embodiment without departing from the scope of the present disclosure and will appreciate further features and advantages of the presently disclosed subject matter based on the description provided. Variations, combinations, and/or modifications to any of the embodiments and/or features of the embodiments described herein that are within the abilities of a person having ordinary skill in the art are also within the scope of the disclosure, as are alternative embodiments that may result from combining, integrating, and/or omitting features from any of the disclosed embodiments.

Use of the term "optionally" with respect to any element of a claim means that the element may be included or omitted, with both alternatives being within the scope of the claim. Additionally, use of broader terms such as "comprises," "includes," and "having" should be understood to provide support for narrower terms such as "consisting of," "consisting essentially of," and "comprised substantially of." Accordingly, the scope of protection is not limited by the description set out above, but is defined by the claims that follow, and includes all equivalents of the subject matter of the claims.

In the preceding description, reference may be made to the spatial relationship between the various structures illustrated in the accompanying drawings, and to the spatial orientation of the structures. However, as will be recognized by those skilled in the art after a complete reading of this disclosure, the structures described herein may be positioned and oriented in any manner suitable for their intended purpose. Thus, the use of terms such as "above," "below," "upper," "lower," "inner," "outer," "upward," "downward," "inward," "outward," etc., should be understood to describe a relative relationship between structures and/or a spatial orientation of the structures. Those skilled in the art will also recognize that the use of such terms may be provided in the context of the illustrations provided by the corresponding figure(s).

Additionally, terms such as "approximately," "generally," "substantially," and the like should be understood to allow for variations in any numerical range or concept with which they are associated. For example, it is intended that the use of terms such as "approximately" and "generally" should be understood to encompass variations on the order of 25%, or to allow for manufacturing tolerances and/or deviations in design.

Each and every claim is incorporated as further disclosure into the specification and represents embodiments of the present disclosure. Also, the phrases "at least one of A, B, and C" and "A and/or B and/or C" should each be interpreted to include only A, only B, only C, or any combination of A, B, and C.

The invention claimed is:

1. A wind turbine, comprising:
   a support structure for supporting a rotatable, vertical hub;
   at least one horizontal support arm connected to the hub;
   at least one wind trap fixedly connected to each of the at least one support arm and having at least one rigid, flat petal that moves between an open position, wherein wind is not blocked by the at least one petal, and a closed position, wherein the at least one petal blocks the wind thereby causing the wind to move the at least one wind trap and rotate the hub;
   the at least one wind trap each having a base wherein the at least one petal is pivotally connected to the base for movement between the open position and the closed position;
   a front framework and a rear framework connected to the base of each of the at least one wind trap for supporting a guide rod extending along a longitudinal axis of the at least one wind trap;
   a synchronizer slideably connected to the guide rod for movement between the open position and the closed position; and
   at least one push rod pivotally connected to the synchronizer and the at least one petal for moving the at least one petal between the open position and the closed position upon movement of the synchronizer.

2. The wind turbine as stated in claim 1, further comprising:
   the front framework having a plurality of front support rods extending from a front side of the at least one wind trap wherein one end of each of the front support rods is connected to the base of the at least one wind trap, and an opposite end of each of the front support rods is connected to a first bushing extending along the longitudinal axis of the at least one wind trap to form a pyramidal configuration;
   the rear framework having a plurality of rear support rods extending from a rear side of the at least one wind trap wherein one end of each of the rear support rods is connected to the base of the at least one wind trap, and an opposite end of each of the rear support rods is connected to a second bushing extending along the longitudinal axis of the at least one wind trap to form a pyramidal configuration; and
   the guide rod being received by and extending between the first bushing and the second bushing.

3. A wind turbine comprising:
   a support structure for supporting a rotatable, vertical hub;
   at least one horizontal support arm connected to the hub;
   at least one wind trap fixedly connected to each of the at least one support arm and having at least one rigid, flat petal that moves between an open position, wherein wind is not blocked by the at least one petal, and a closed position, wherein the at least one petal blocks the wind thereby causing the wind to move the at least one wind trap and rotate the hub;
   the at least one wind trap each having a base wherein the at least one petal is pivotally connected to the base for movement between the open position and the closed position; and
   a scoop having side walls extending from the base of the wind trap to form a diamond structure.

4. A wind turbine, comprising:

a support structure for supporting a rotatable, vertical hub;

at least one horizontal support arm connected to the hub;

at least one wind trap connected to each of the at least one horizontal support arm and having at least one petal that moves between an open position, wherein wind is not blocked by the at least one petal, and a closed position, wherein the at least one petal blocks the wind thereby causing the wind to move the at least one wind trap and rotate the hub;

the at least one horizontal support arm pivotally connected to the hub;

a spindle connected to and extending upward from the support structure; and a lowering arm connected to each of the at least one wind trap and pivotally connected to the spindle such that the at least one horizontal support arm can be positioned in an operating position, wherein the at least one horizontal support arm extends horizontally to allow the wind turbine to operate, and a maintenance position, wherein the at least one horizontal support arm and the lowering arm pivot downwards to allow the wind trap to lower for performing maintenance on the wind trap and placing the wind trap in a protective structure.

5. A wind turbine comprising:

a support structure;

a hub connected to the support structure and rotatable about a vertical longitudinal axis;

at least one horizontal support arm connected to the hub;

at least one wind trap connected to the at least one horizontal support arm and each of the at least one wind trap having a base;

a plurality of petals pivotally connected to the base wherein the plurality of petals move between an open position, wherein wind is not blocked by the petals, and a closed position, wherein the petals adjacently align one another to block the wind thereby causing the wind to move the at least one wind trap and rotate the hub;

the base of the at least one wind trap having four sides to form a square frame;

each of the plurality of petals having a triangular configuration;

a front framework and a rear framework connected to the base of each of the at least one wind trap for supporting a guide rod extending along a longitudinal axis of the at least one wind trap;

a synchronizer slideably connected to the guide rod for movement between the open position and the closed position; and at least one push rod pivotally connected to the synchronizer and each of the plurality of petals for moving at least one petal between the open position and the closed position upon movement of the synchronizer.

6. The wind turbine as stated in claim 5, further comprising:

the front framework having a plurality of front support rods extending from a front side of the at least one wind trap wherein one end of each of the front support rods is connected to the base of the at least one wind trap, and an opposite end of each of the front support rods is connected to a first hub extending along the longitudinal axis of the at least one wind trap to form a pyramidal configuration;

the rear framework having a plurality of rear support rods extending from a rear side of the at least one wind trap wherein one end of each of the rear support rods is connected to the base of the at least one wind trap, and an opposite end of each of the rear support rods is connected to a second hub extending along the longitudinal axis of the at least one wind trap to form a pyramidal configuration; and the guide rod being received by and extending between the first hub and the second hub.

7. The wind turbine of claim 5, further comprising:

the at least one horizontal support arm pivotally connected to the hub;

a spindle extending from and supported by the support structure; and a lowering arm connected to each of the at least one wind trap and pivotally connected to the spindle such that the at least one horizontal support arm can be positioned between an operating position, wherein the at least one horizontal support arm extends horizontally to allow the wind turbine to operate, and a maintenance position, wherein the at least one horizontal support arm and the lowering arm pivot downwards to allow the wind trap to lower for performing maintenance on the wind trap.

8. The wind turbine as stated in claim 5, further comprising:

a generator operably connected to the hub wherein the hub drives the generator upon rotation of the hub to generate power.

* * * * *